(12) United States Patent
Yang et al.

(10) Patent No.: US 12,205,257 B2
(45) Date of Patent: Jan. 21, 2025

(54) METHOD AND DEVICE FOR REDUCING IMAGE NOISE

(71) Applicant: Lenovo (Singapore) Pte. Ltd., Singapore (SG)

(72) Inventors: Xueyong Yang, Kanagawa (JP); Limin Xiao, Kanagawa (JP)

(73) Assignee: Lenovo (Singapore) Pte. Ltd., Singapore (SG)

( * ) Notice: Subject to any disclaimer, the term of this patent is extended or adjusted under 35 U.S.C. 154(b) by 54 days.

(21) Appl. No.: 18/305,315

(22) Filed: Apr. 21, 2023

(65) Prior Publication Data

US 2024/0354909 A1   Oct. 24, 2024

(51) Int. Cl.
*G06T 5/70*       (2024.01)
*G06V 10/141*    (2022.01)
*G09G 5/10*       (2006.01)
*H04N 5/04*       (2006.01)

(52) U.S. Cl.
CPC .............. *G06T 5/70* (2024.01); *G06V 10/141* (2022.01); *G09G 5/10* (2013.01); *H04N 5/04* (2013.01); *G09G 2320/0626* (2013.01)

(58) Field of Classification Search
CPC .......... G06T 5/70; G06V 10/141; G09G 5/10; G09G 2320/0626; H04N 5/04
See application file for complete search history.

(56) References Cited

U.S. PATENT DOCUMENTS

| | | | | |
|---|---|---|---|---|
| 5,487,092 A | * | 1/1996 | Finney | H04L 7/02 375/373 |
| 6,108,782 A | * | 8/2000 | Fletcher | H04L 43/12 713/153 |
| 6,907,041 B1 | * | 6/2005 | Turner | H04L 12/5601 370/414 |
| 7,134,035 B2 | * | 11/2006 | Sharma | G06F 1/12 713/400 |
| 7,424,080 B1 | * | 9/2008 | Liu | H04N 21/4382 375/E7.278 |
| 8,290,423 B2 | * | 10/2012 | Wang | H04B 17/23 455/2.01 |
| 8,923,141 B2 | * | 12/2014 | Bryant | H04J 3/0679 370/252 |
| 9,058,135 B1 | * | 6/2015 | Schumacher | G06F 1/10 |
| 10,057,541 B2 | * | 8/2018 | Chung | H04N 25/745 |
| 2002/0059535 A1 | * | 5/2002 | Bekritsky | H04N 5/4448 342/465 |
| 2006/0195780 A1 | * | 8/2006 | Zuccolotto | G06F 40/18 715/273 |
| 2006/0203851 A1 | * | 9/2006 | Eidson | H04J 3/085 370/503 |
| 2007/0124756 A1 | * | 5/2007 | Covell | G06F 16/635 348/E7.071 |

(Continued)

*Primary Examiner* — Michael B. Pierorazio
(74) *Attorney, Agent, or Firm* — Osha Bergman Watanabe & Burton LLP

(57) ABSTRACT

A method for reducing image noise in computer vision includes identifying a pattern of periods during which visible light is not emitted by the pixels; identifying a first black period during which a first group of lines of the pixels does not emit visible light; capturing, with an image sensor installed behind the display, a first image that longitudinally spans only the first group of lines of the pixels; and synchronizing the capturing of the first image with the first black period.

7 Claims, 19 Drawing Sheets

(56) References Cited

U.S. PATENT DOCUMENTS

| | | | |
|---|---|---|---|
| 2007/0297799 A1* | 12/2007 | Tse-Au | H04Q 11/0005 398/58 |
| 2008/0069150 A1* | 3/2008 | Badt | H04J 3/0667 370/252 |
| 2008/0082510 A1* | 4/2008 | Wang | G06F 16/683 |
| 2010/0085989 A1* | 4/2010 | Belhadj | H04J 3/0667 370/503 |
| 2010/0135314 A1* | 6/2010 | Fourcand | H04J 3/1611 370/419 |
| 2010/0272102 A1* | 10/2010 | Kobayashi | H04N 21/43632 370/389 |
| 2011/0164625 A1* | 7/2011 | Fourcand | H04J 3/0667 370/498 |
| 2011/0202967 A1* | 8/2011 | Hecht | H04N 21/854 725/114 |
| 2011/0286442 A1* | 11/2011 | Maurice | H04W 56/0015 370/350 |
| 2011/0317991 A1* | 12/2011 | Tsai | G03B 9/70 396/180 |
| 2012/0059845 A1* | 3/2012 | Covell | H04N 21/4394 707/769 |
| 2012/0162490 A1* | 6/2012 | Chung | H04N 7/144 348/E5.037 |
| 2012/0249806 A1* | 10/2012 | Gong | H04N 23/63 348/E5.045 |
| 2012/0250704 A1* | 10/2012 | Yamada | H04J 3/0661 370/503 |
| 2012/0284434 A1* | 11/2012 | Warren | G06F 13/00 710/22 |
| 2012/0331026 A1* | 12/2012 | Menkhoff | H03H 17/0433 708/300 |
| 2013/0103861 A1* | 4/2013 | Ahn | H04W 52/0261 710/14 |
| 2013/0185374 A1* | 7/2013 | Fukasawa | H04L 67/00 709/208 |
| 2013/0194496 A1* | 8/2013 | Atherton | H04N 21/242 348/E9.034 |
| 2013/0215753 A1* | 8/2013 | Le Pallec | H04L 47/283 370/235 |
| 2014/0150021 A1* | 5/2014 | Subramanian | H04N 21/235 725/36 |
| 2014/0165085 A1* | 6/2014 | Karacali-Akyamac | H04N 21/4788 725/14 |
| 2014/0196077 A1* | 7/2014 | Gordon | H04N 21/25816 725/31 |
| 2018/0084224 A1* | 3/2018 | McNelley | H04N 7/15 |
| 2019/0058929 A1* | 2/2019 | Young | H04N 21/235 |
| 2020/0314467 A1* | 10/2020 | Goldrei | H04N 21/4341 |
| 2022/0207658 A1* | 6/2022 | Tong | G06T 5/73 |
| 2022/0343472 A1* | 10/2022 | Ollila | H04N 25/68 |
| 2022/0398759 A1* | 12/2022 | Schindler | G06V 10/145 |
| 2023/0143803 A1* | 5/2023 | Lee | G09G 3/2011 345/690 |
| 2023/0403906 A1* | 12/2023 | Metz | H10K 59/90 |

* cited by examiner

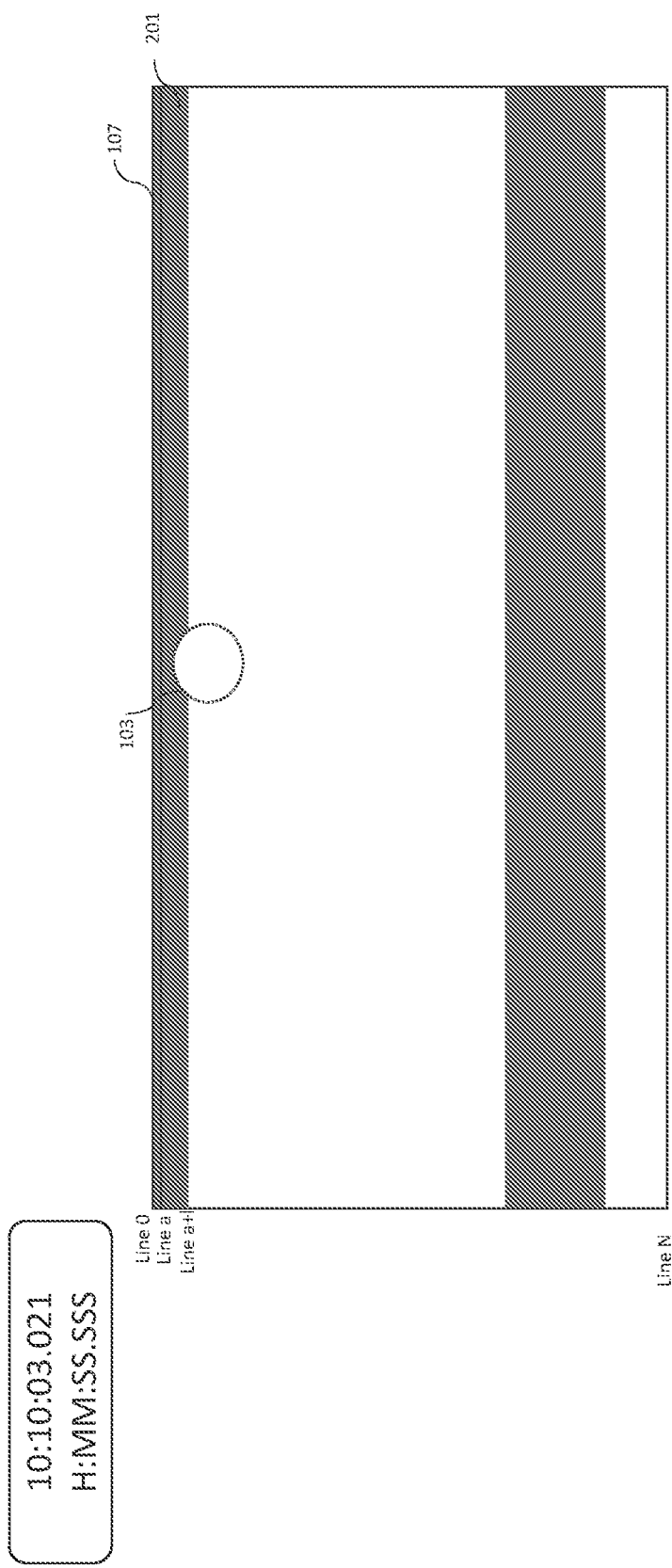

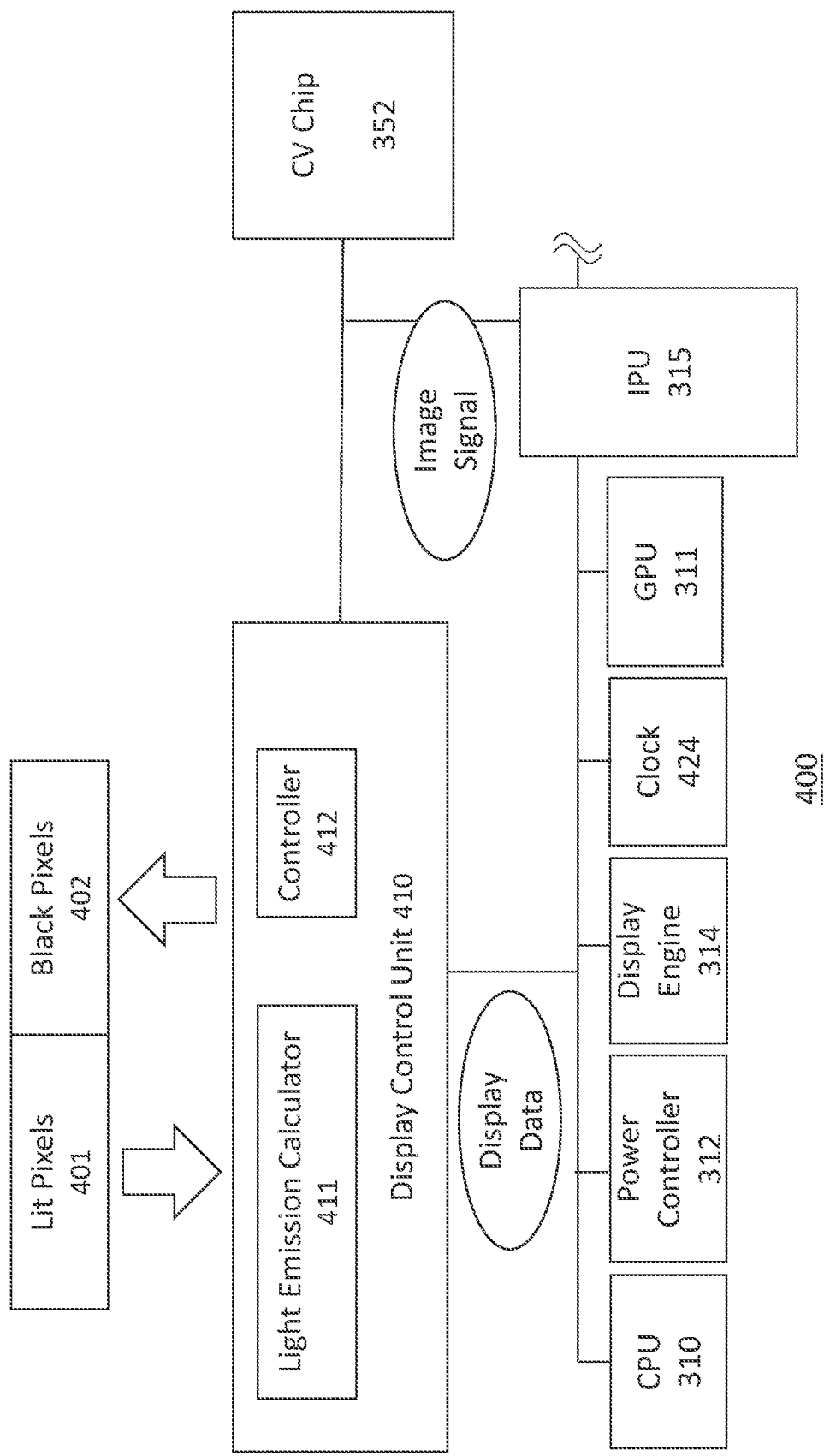

METHOD AND DEVICE FOR REDUCING IMAGE NOISE

TECHNICAL FIELD

The present disclosure relates to computer vision, and more particularly to a method and a device for reducing noise in images using computer vision.

BACKGROUND

Computer vision plays a pivotal role in today's electronic devices. It carries out tasks such as facial recognition using two types of image sensors: one type of sensors excited by visible light (RGB sensor) and another type of sensors excited by infrared light (IR sensor). RGB sensors are engaged to generate pictographic representation of colored images, while IR sensors captures features of objects and identify the objects by their forms or other accompanying characteristics.

Pixels of a computer screen produce colors through phosphor, which emits light in three colors: green, red, and blue. A pixel is gray if all phosphors emit light at reduced intensity. For example, when an image is taken during an electrical interference to an image sensor and phosphors emit light at reduced intensity, a gray pixel appears as noise. The occurrence of repeated noise is also observed in computer vision. In particular, when the display of a computer device is turned on and the computer vision employs under-display image sensors, image noise results in dots on a screen and disrupts the image.

SUMMARY

In general, one or more embodiments relate to a method for reducing image noise in computer vision. The method comprises: identifying a pattern of periods during which visible light is not emitted by the pixels; identifying a first black period during which a first group of lines of the pixels does not emit visible light; capturing, with an image sensor installed behind (i.e., under) the display, a first image that longitudinally spans only the first group of lines of the pixels; and synchronizing the capturing of the first image with the first black period.

In general, one or more embodiments relate to a computer-vision enabled device. The device comprises: a display; an image sensor behind the display; and a controller that: captures with the image sensor, a first image that longitudinally spans only a first group of lines of the pixels that emits no visible light during a first black period; and synchronizes the capturing of the first image with the first black period.

Other aspects will be apparent from the following description and the appended claims.

BRIEF DESCRIPTION OF DRAWINGS

FIGS. 2A and 2B illustrate schematic views of a display of the device according to one or more embodiments.

FIG. 2I illustrates another schematic view of the device with an image of the person according to one or more embodiments.

FIGS. 4A and 4B show another functional block diagram of select components in the device according to one or more embodiments.

DETAILED DESCRIPTION

Figure 1B:
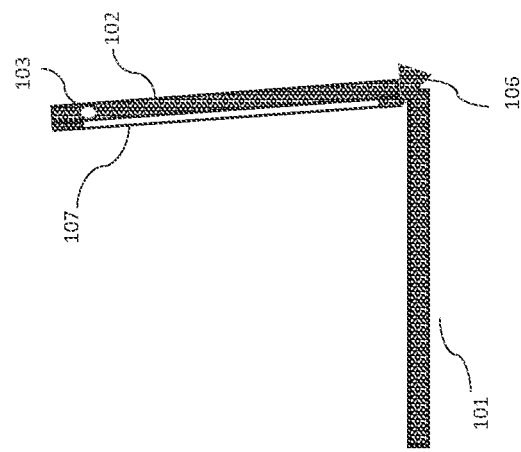
FIGS. 1A and 1B show a perspective view and a side view, respectively, of a computer-vision enabled device in accordance with one or more embodiments.

Specific embodiments will now be described in detail with reference to the accompanying figures. Like elements in the various figures are denoted by like reference numerals for consistency.

In the following detailed description of embodiments, numerous specific details are set forth in order to provide a more thorough understanding of the present disclosure. However, it will be apparent to one of ordinary skill in the art that the embodiments may be practiced without these specific details. In other instances, well-known features have not been described in detail to avoid unnecessarily complicating the description.

In general, one or more embodiments provide a method for reducing image noise related to a display and a device for reducing image noise in the field of display technology. More specifically, one or more embodiments are directed to a method for reducing image noise detected by under-display image sensors in a computing device (e.g., a personal computer, personal laptop, smart phone, personal digital assistant, tablet computer, other mobile device, server, etc.).

This is achieved, for example, by a method based on black-period synchronized image capturing. The method according to one or more embodiments begins with identifying a pattern of periods ("black period") during which visible light is not emitted by pixels overlapping an image sensor ("overlapping pixels") on a display of a computer with computer vision (CV). A group of lines of the pixels is selected and the black period of the group is determined. The method realizes image noise reduction by capturing, with the image sensor installed behind (i.e., under) a display, an image that longitudinally spans only the group of lines of the pixels during the black period.

Figure 1A:
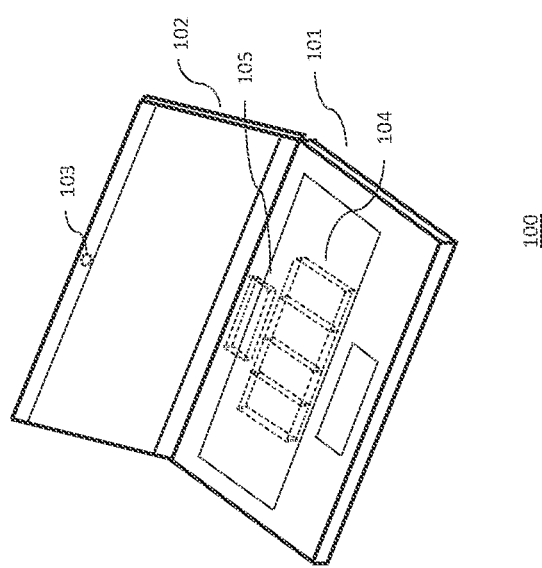

FIGS. 1A and 1B show a schematic view of a computing device (computer-vision enabled device) 100 that implements a method for reducing image noise according to one or more embodiments. As shown, the device 100 comprises a device body (including lower shell 101 and an upper shell 102), an image sensor 103, a processor 104, a CV chip (circuit) 105 connected to the image sensor 103 and the processor 104, a hinge 106, and a display 107. The image sensor 103 may be integrated into or separate from the device 100. For example, the image sensor 103 may be disposed behind a display of the device 100. The device 100 may also include multiple image sensors 103. The CV chip 105 may be implemented together with a central processing unit (CPU 310), an image processing unit (IPU 315), and an image signal processor (ISP).

The image sensor 103 generates image data, based on visible light or infrared radiation, and transmits the image data to the CV chip 105. The term "image data" is used to mean raw image data but also metadata of the acquired image in certain contexts.

One skilled in the art will recognize that the image sensor 103 and the CV chip 105 may transmit the image data using various protocols and connections including but not limited to Mobile Industry Processor Interface (MIPI) protocols or Universal Serial Bus (USB) protocols.

Figure 2B:
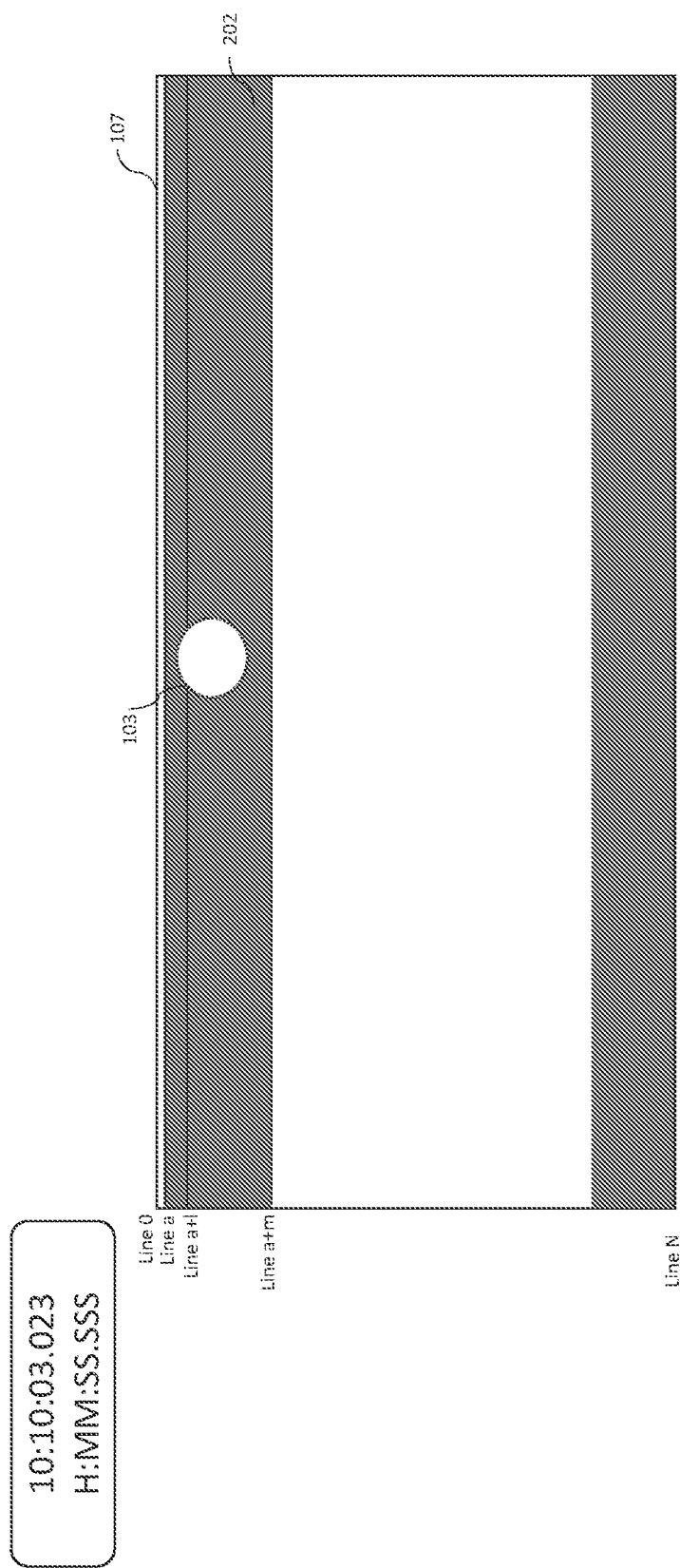

FIGS. 2A to 2I show schematic views of the device 100 implementing a method for reducing image noise according to one or more embodiments. FIGS. 2A to 2D show an example in which the capturing of a first image that is displayed over the first group of lines of pixels is synchronized with a first black period. FIGS. 2E to 2H show an example in which the capturing of a second image that is displayed over a second group of lines of pixels is synchronized with a second black period. FIG. 2I shows one implementation of the display 107 showing the first image, the second image, and other images in combination.

As will be discussed in detail, FIGS. 2A-2I illustrate how the image capturing in device 100 is synchronized with so-called "black periods" during which phosphors pause light emission. The timing and way phosphors luminesce on the display 107 may be controlled by a program defining the luminescence of pixels ("luminescence-determining program"). The luminescence-determining program instructs the device 100 to cause or not cause phosphor luminescence in a certain pixel. The luminescence-determining program prevents continuous excitation of phosphors and extends the pixel lifetime. For example, the luminescence-determining program may set a cycle of "black period," or a non-excitation period for individual pixels, including the overlapping pixels, so that phosphors in the individual pixels are not continuously excited and worn out quickly.

Further, in one or more embodiments, the device 100 determines whether and when the overlapping pixels are not emitting light. For example, a group of lines of pixels in the display 107 does not emit light, as the luminescence-determining program assigns the group of lines of pixels to a "black period." In some embodiments, the device 100 may determine that the group of lines of pixels is emitting light, by detecting and measuring light from the pixels with a light sensor. The device 100 identifies a pattern of black period (e.g., "a first black period") during which a first group of lines of pixels (e.g., some of the overlapping pixels) will not emit light. The device 100 then determines that the first group of lines of pixels (e.g., some of the overlapping pixels) are at black periods at a certain interval of time, and predicts the next time when the first group of lines of pixels will be at a black period ("second black period") based on the time data and the pattern of black period for the first group of lines of pixels.

In other embodiments, the assignment of black periods to individual pixel lines may be provided as a preset data by a display manufacturer ("manufacturer-coded program") to the device 100. The first black period and the first group of lines of pixels may be identified by analyzing the manufacturer-coded program.

Returning to the figures, FIGS. 2A and 2B show a schematic front view of the display 107 of the device 100. The image sensor 103 is located behind the overlapping pixels (Line (a) to Line (a+m) of the display 107), at the upper middle portion. Each of these figures shows how pixels of the display 107 emit or not emit light at a particular moment in time.

For example, FIG. 2A shows how the pixels emit or not emit light at 10:10:03.021. The lines of black pixels 201 stretch from Line (0) to Line (a+l) and include some of the overlapping pixels. Thus, the luminescence-determining program assigned the group of lines of pixels 201 to a black period so that they do not emit light. The black period occurs periodically to the pixels over the whole display. One or more of embodiments of the invention use the time window that the black period occurs in line (a) to line (a+l) in front of the image sensor (103) position.

Similarly, FIG. 2B shows how pixels emit or not emit light at 10:10:03.023. Here, m lines of black pixels 202 that include some of the overlapping pixels and stretch from Line (a) to Line (a+m) were assigned a black period so that they do not emit light. Thus, the device 100 identifies pixels in Line (a) to Line (a+l) that remain black during 10:10:03.021 to 10:10:03.023 ("first black period") as the first group of lines of pixels 203. The device 100 also identifies a pattern of black periods for the first group of lines of pixels 203 so that an imaging module 340 (to be described later) in the device 100 synchronizes the capturing of a partial image of a user to be displayed by the first group of lines of pixels 203, with the first black period.

Figure 2C:
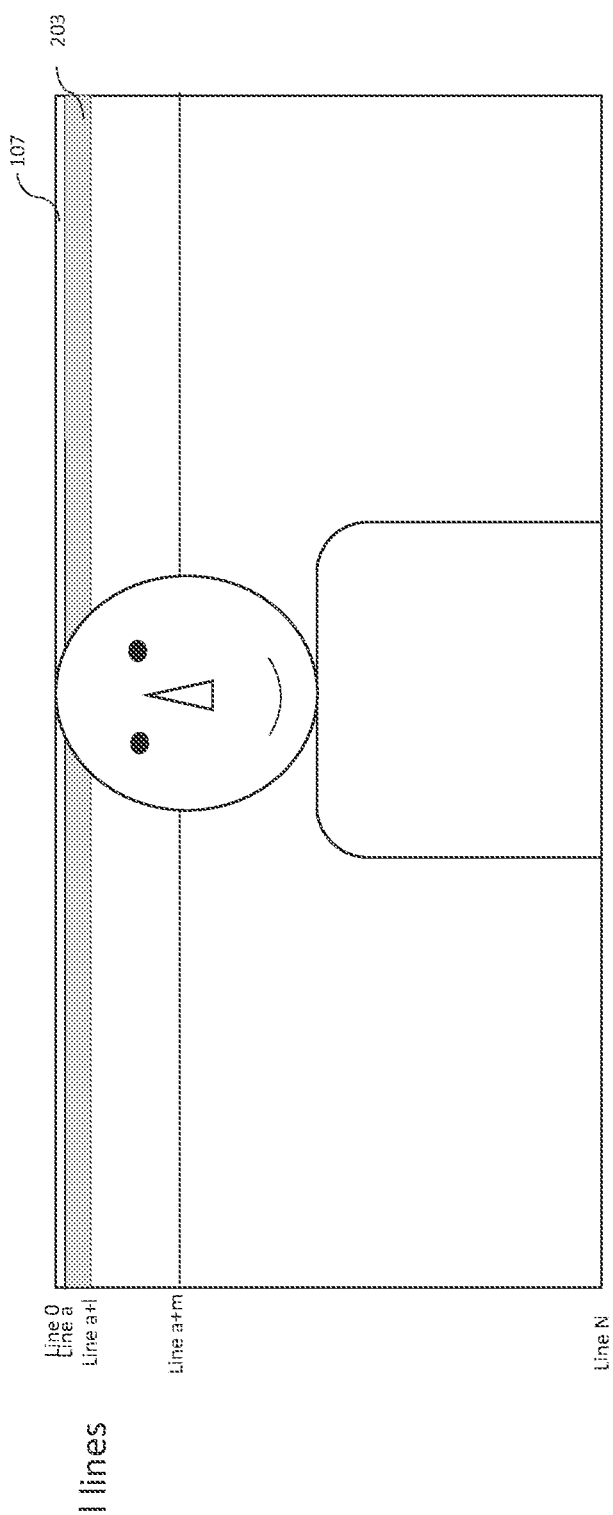
FIG. 2C illustrates a schematic view of the display with an image of a person according to one or more embodiments.

In accordance with FIGS. 2A and 2B, FIG. 2C illustrates an exemplary implementation of the device 100, showing a partial image of a user in front of the display 107, during the first black period. The user's upper head is sensed by the image sensor 103. The captured image ("a first image") is displayed over the first group of lines of pixels 203.

Figure 2D:
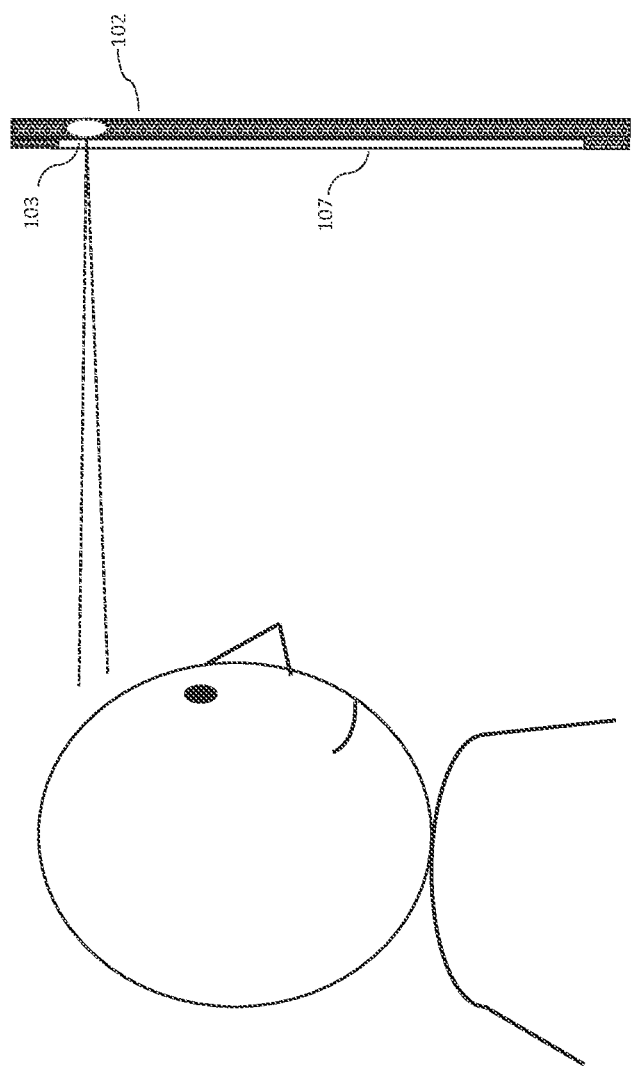
FIG. 2D illustrates a schematic side view of the device and the person in front of the display according to one or more embodiments.

Next, FIG. 2D illustrates an exemplary synchronized image capturing by the imaging module 340. The image sensor 103 captures the first image, a partial image of the user, during the first black period. The first image is then displayed over the first group of lines of pixels 203 with reduced image noise as a result of the first image being captured during the first black period, as described above.

Figure 2E:
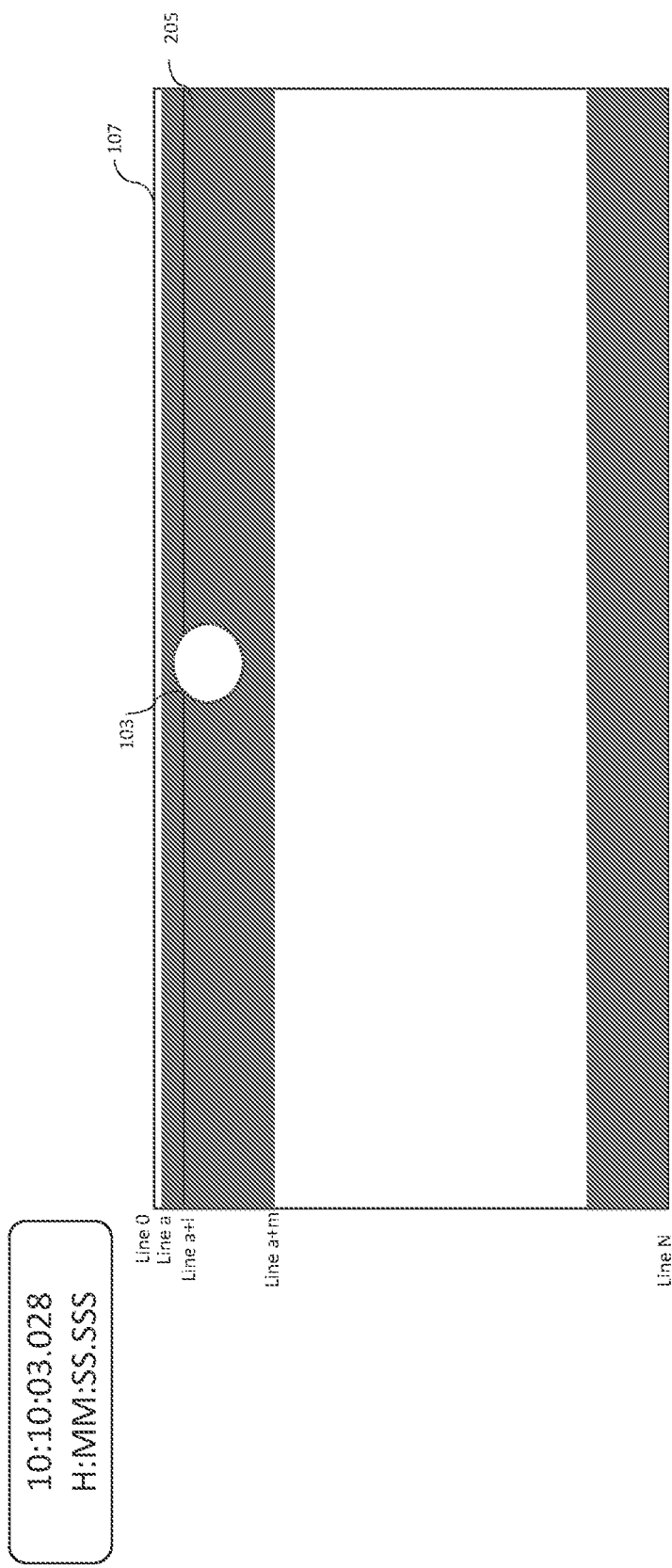
FIGS. 2E and 2F illustrate other schematic views of the display according to one or more embodiments.
Figure 2F:
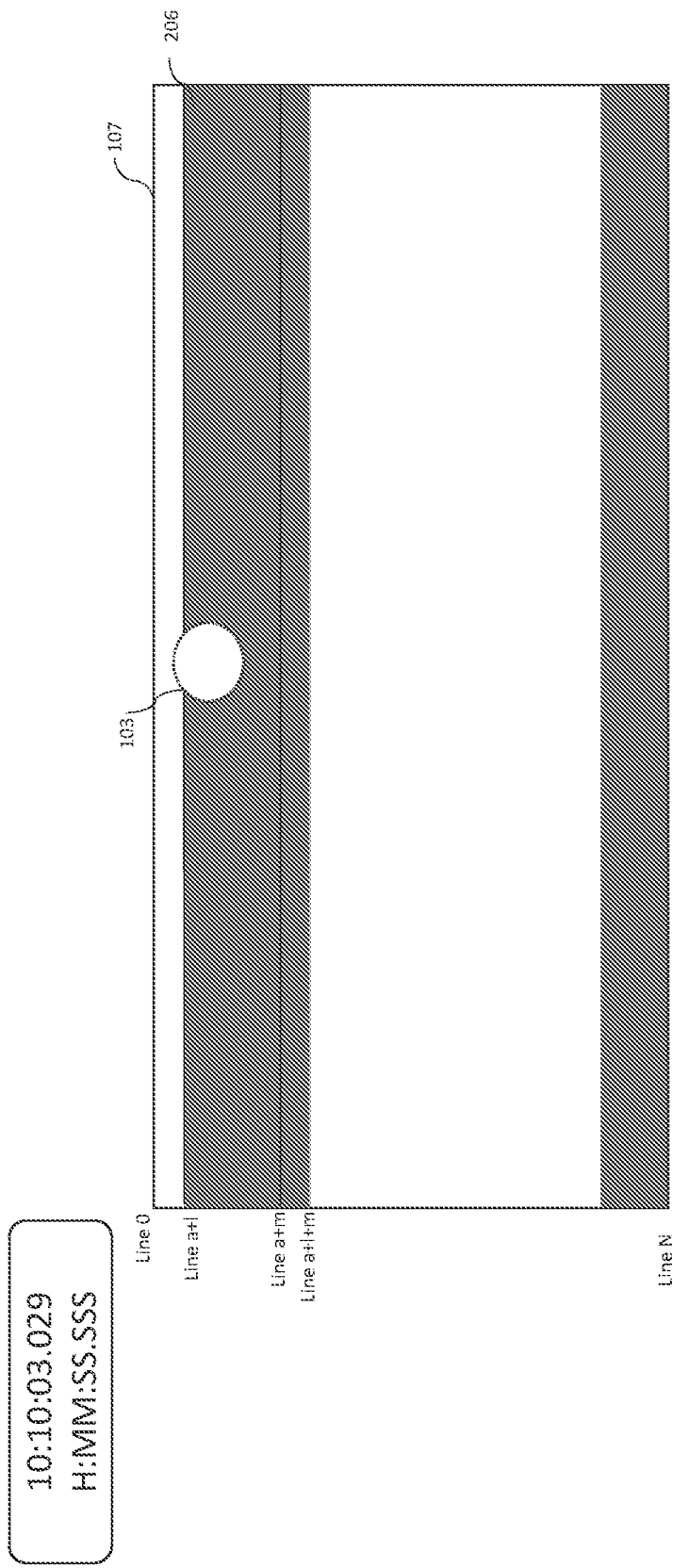

Moving on, FIGS. 2E and 2F show a schematic front view of the display of the device 100 according to additional embodiments. FIG. 2E shows how pixels in the display 107 are lit or black at 10:10:03.028. The m lines of black pixels 205 stretch from Line (a) to Line (a+m) and include a part of the overlapping pixels.

FIG. 2F shows how pixels are lit or black at 10:10:03.029, with m lines of black pixels 206 including a part of the overlapping pixels. Here, upon finding that the lines of pixels in Line (a+l) to Line (a+m) 207 remain black during 10:10:03.028 to 10:10:03.029, the second black period and the second group of lines of pixels 207 are identified. The imaging module 340 synchronizes the capturing of a partial image of a user, which will be displayed by the second group of lines of pixels 207, with the second black period.

Figure 2G:
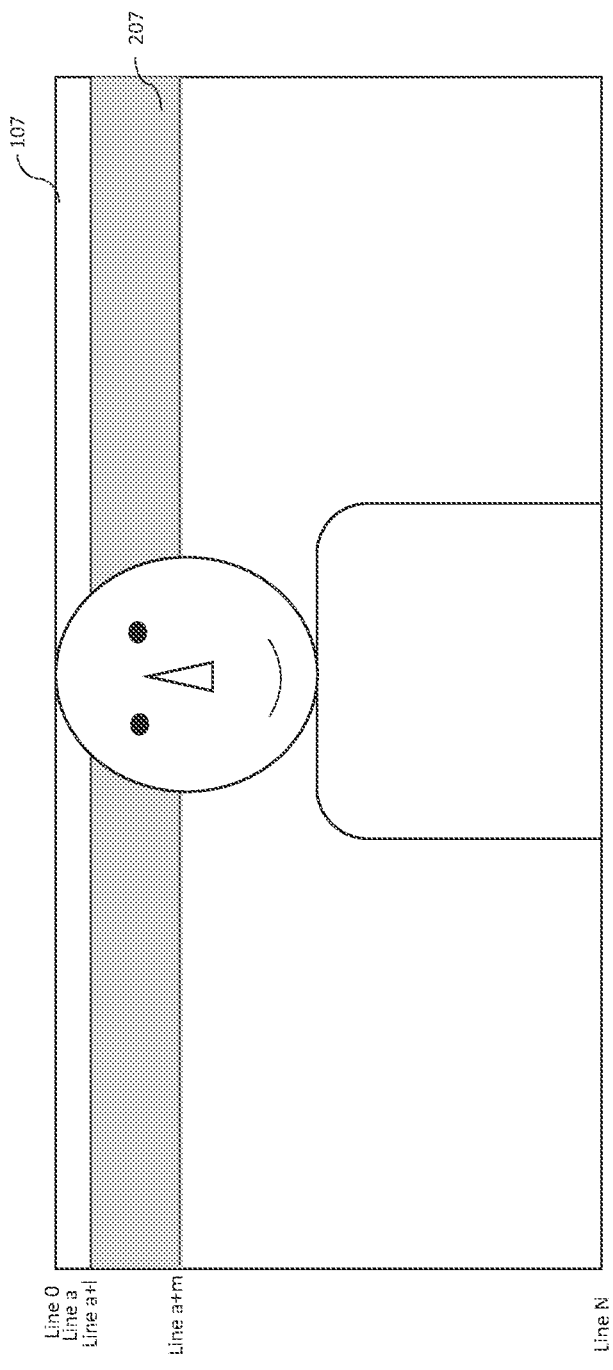
FIG. 2G illustrates another schematic view of the display with an image of the person according to one or more embodiments.

In accordance with FIGS. 2E and 2F, FIG. 2G illustrates an exemplary implementation of a second image, a partial image of a user in front of the display 107, captured from 10:10:03.028 to 10:10:03.029 (during the second black period). The user's upper face is sensed by the image sensor 103.

Figure 2H:
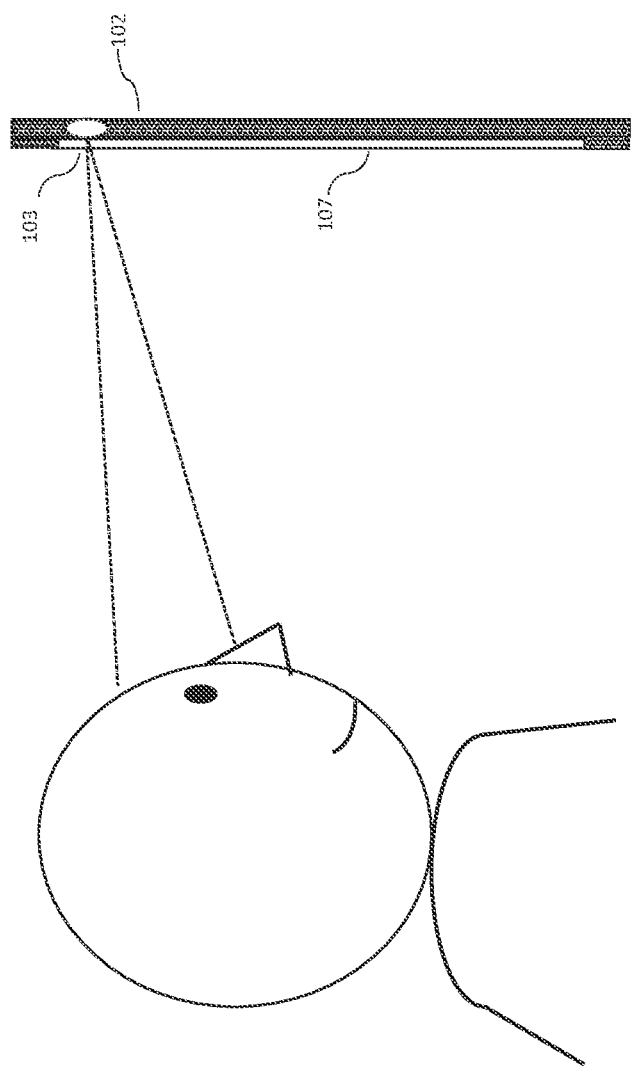
FIG. 2H illustrates another schematic side view of the device and the person in front of the display according to one or more embodiments.
Figure 21:
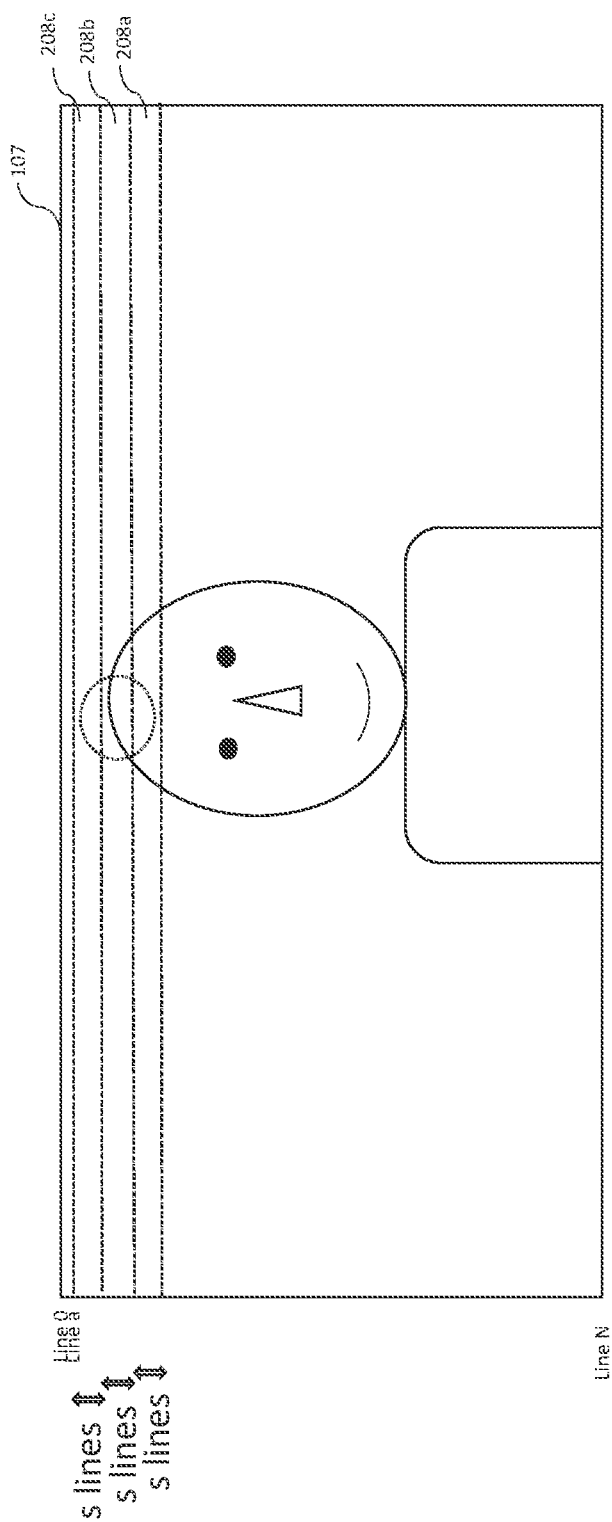

Next, FIG. 2H illustrates a schematic side view of the device 100 according to one or more embodiments. The second image is displayed over the second group of lines of pixels 207 with reduced image noise as a result of the imaging module 340 synchronizing the capturing of the second image by the image sensor 103 with the second black period (from 10:10:03.028 to 10:10:03.029).

The process described above may be repeated for other black periods of groups of lines of pixels, which may display captured images according to one or more embodiments.

In one or more embodiments, the device 100 may divide the overlapping pixels into n groups of lines, which may span the entirety of the overlapping pixels. In such a case, the imaging module 340 may capture a partial image to be displayed by each of the n groups of lines of pixels. The imaging module 340 captures n images that span one of the n groups of lines of pixels and synchronizes the capturing of the n images with the respective black periods.

For example, as shown in FIG. 2I, the device 100 may display n images over n groups of lines of pixels, 208a to 208c. For example, three images may be captured (n=3) in some embodiments. FIG. 2I illustrates one combined image showing a partial image of the user, where each of the n groups of lines of pixels includes (s) pixel lines. The device 100 may identify a first to an n-th black periods during which visible light is not emitted by a first to an n-th groups of lines of pixels, respectively, where n is an integer greater than two. The imaging module 340 may capture a first to an n-th images that longitudinally span only the first to the n-th groups of lines of pixels, respectively. Each of the first to the n-th groups may have identical length of pixel lines in certain implementations. The imaging module 340 may control capturing of the images to be synchronized with the first to the n-th black periods, respectively. The synchronized image capturing achieves reduction of image noise because the timing of capturing images is controlled to coincide with black periods of the relevant pixel lines.

In one or more embodiments, the imaging module 340 transmits n sets of image data sequentially to the CV chip 105 for encoding, aggregation, and the like. Alternatively, the image data may be combined and processed by a controller of the device 100 before transmission to the CV chip 105.

Figure 3A:
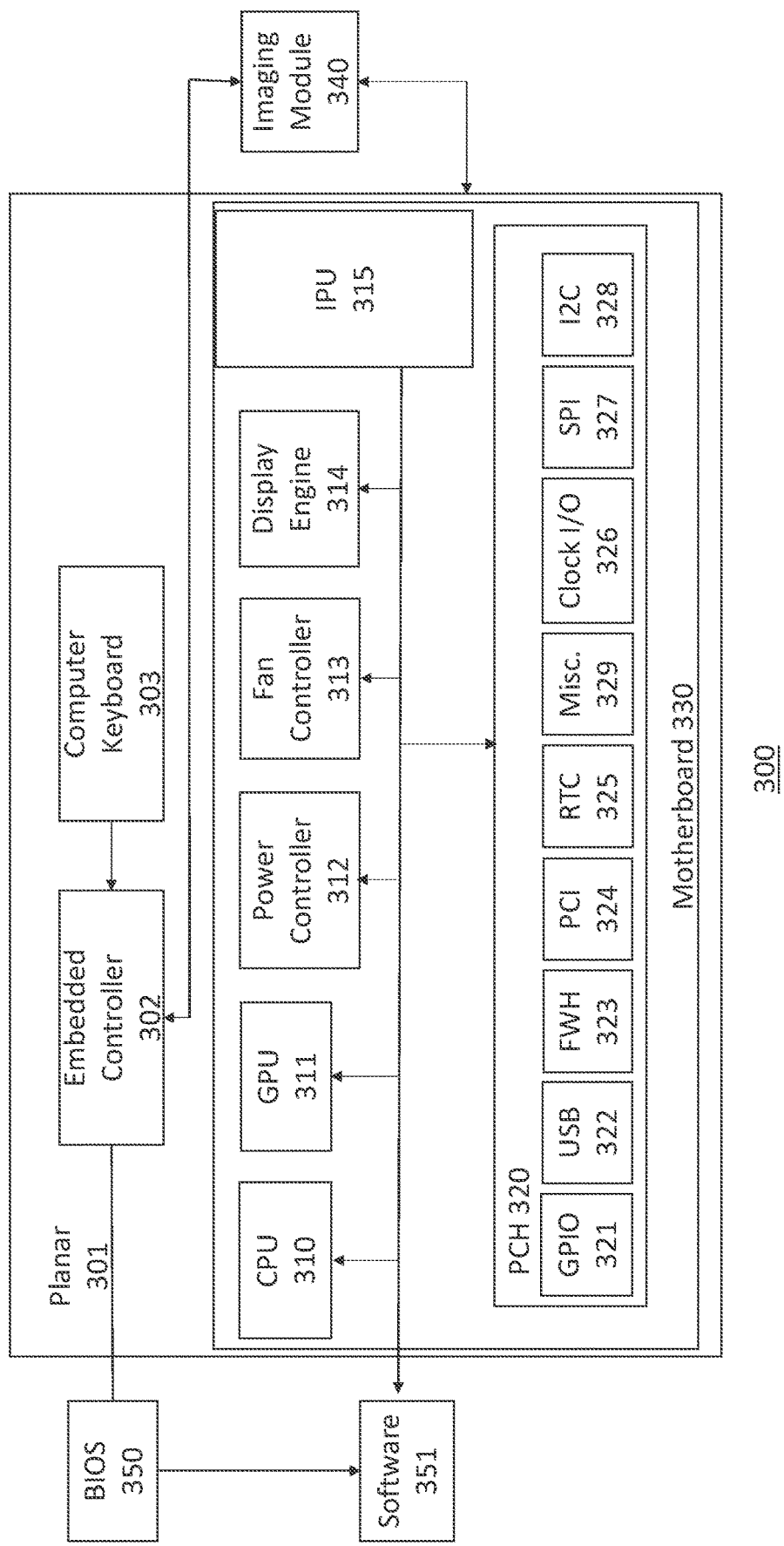
FIG. 3A shows a functional block diagram of select components in the device according to one or more embodiments.

FIG. 3A shows a functional block diagram of components 300 included in the device 100 for reducing image noise according to one or more embodiments. In some embodiments, the imaging module 340 is connected to a motherboard 330 and can transmit image data to the motherboard 330 via a connection. The motherboard 330 may include a platform controller hub (PCH) 320, a CPU 310, a GPU 311, an IPU 315, a power controller 312, a fan controller 313, and a display engine 314. The PCH 320 may include modules for transmitting and receiving data via I2C 328, GPIO 321, USB I/O protocols 322, and so on. A clock I/O module 326 may be included. The display engine 314 may be connected to a display 107 via any suitable connection.

Figure 3C:
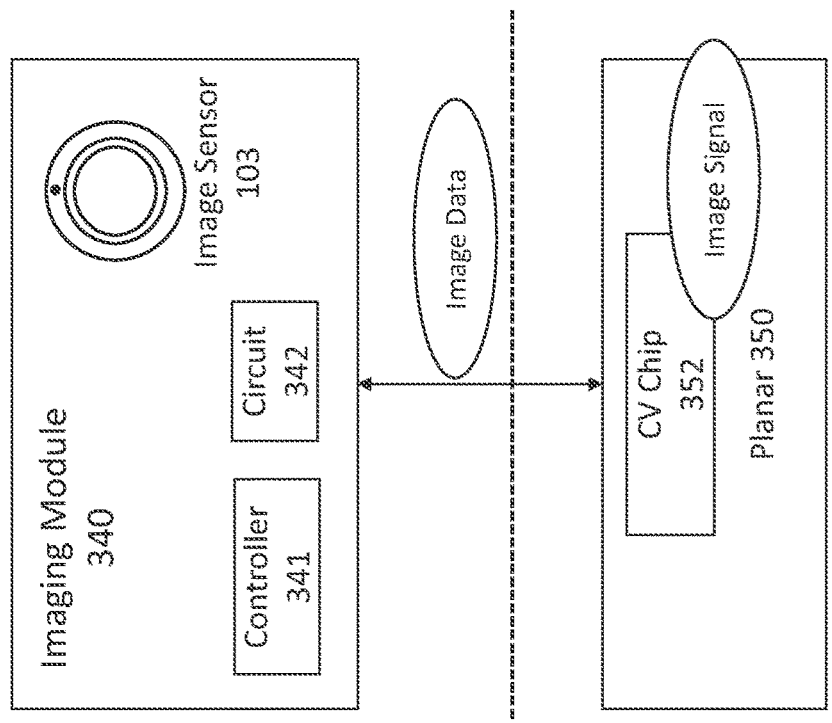
FIGS. 3B to 3E each show a functional block diagram of select components of the device shown in FIG. 3A, including an imaging module.
Figure 3B:
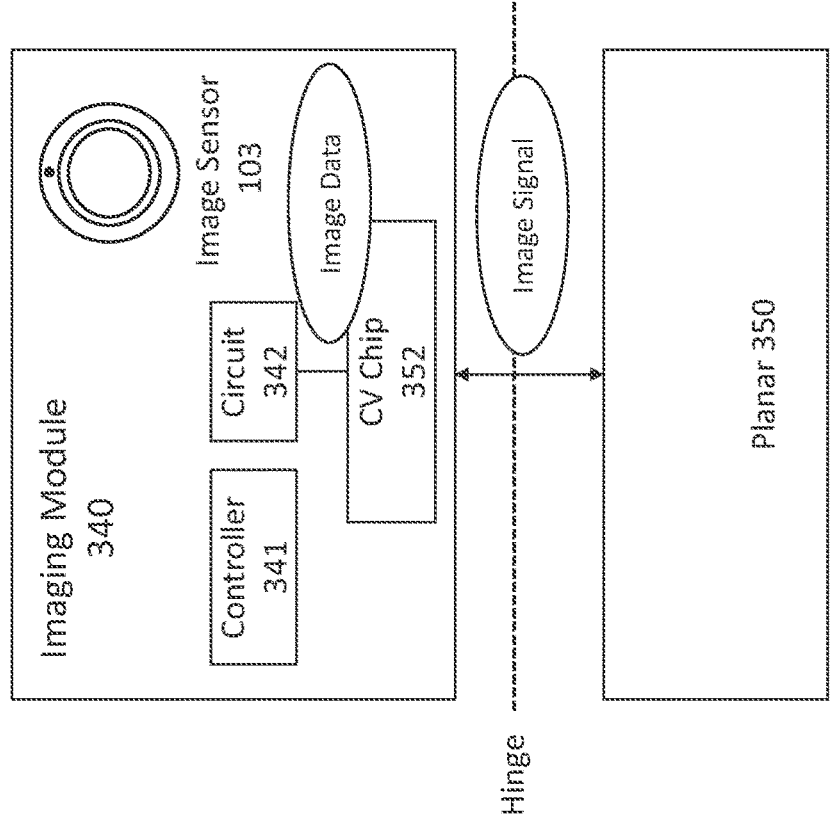

FIG. 3B shows a functional block diagram of the imaging module 340 including a CV chip 352 and related components. The imaging module 340 may include a CV Firmware (CV FW) according to one or more embodiments.

For example, the imaging module 340 may include a controller 341, a circuit 342, and an image sensor 103. The imaging module 340 may also include a computer vision (CV) chip 352.

The image sensor 103 may be an RGB image sensor that is sensitive to visible light and/or an infrared (IR) image sensor that is sensitive to infrared radiation. The circuit 342 may include an integrated Sensor Hub (iSH), an image processing unit (IPU) 315, and a USB interface in some implementations.

As one option, the CV chip 352 may include a field programmable gate array (FPGA), a serial peripheral interface flash memory (SPI Flash) connected to the FPGA, and an MCU. The SPI interface may be implemented as a standard interface of a flash memory. The flash memory may be incorporated as a fully programmable frame such as QSPI and may be external to the FPGA.

As another option, the FPGA includes a one-time programmable memory. In such implementations, the program in the one-time programmable memory may perform functions of the flash memory and may obviate the need to install the flash memory.

The image sensor 103 may be connected to the CV chip 352 via a suitable connection, including via a MIPI connection.

Image data acquired by the image sensor 103 is transmitted from the circuit 342 to the CV chip 352 via a connection. The CV chip 352 may be configured to process image data, including aggregation or compression, before transmission of an image signal to the IPU 315, for example.

In one embodiment, the controller 341 adjusts the image sensor 103 to acquire an image in accordance with a selected condition, including the focus, range, or gain, exposure of image acquisition. Such embodiment may be compatible with the incorporation of an autofocus lens at the imaging module 340. In another embodiment, the CV chip 352 adjusts the image sensor 103 to acquire an image. The CV chip 352 or the controller 341 receives time data from the clock I/O unit 326 in the motherboard 330 and adjust the timing of image capturing.

Similarly, FIG. 3C shows another functional block diagram of the imaging module 340 according to one or more embodiments. The imaging module 340 includes a controller 341, a circuit 342, and an image sensor 103. The CV chip 352 is disposed in the planar 350.

Once an image is acquired by the image sensor 103, the circuit 342 may generate image data and transmit the image data to the CV chip 352.

Figure 3E:
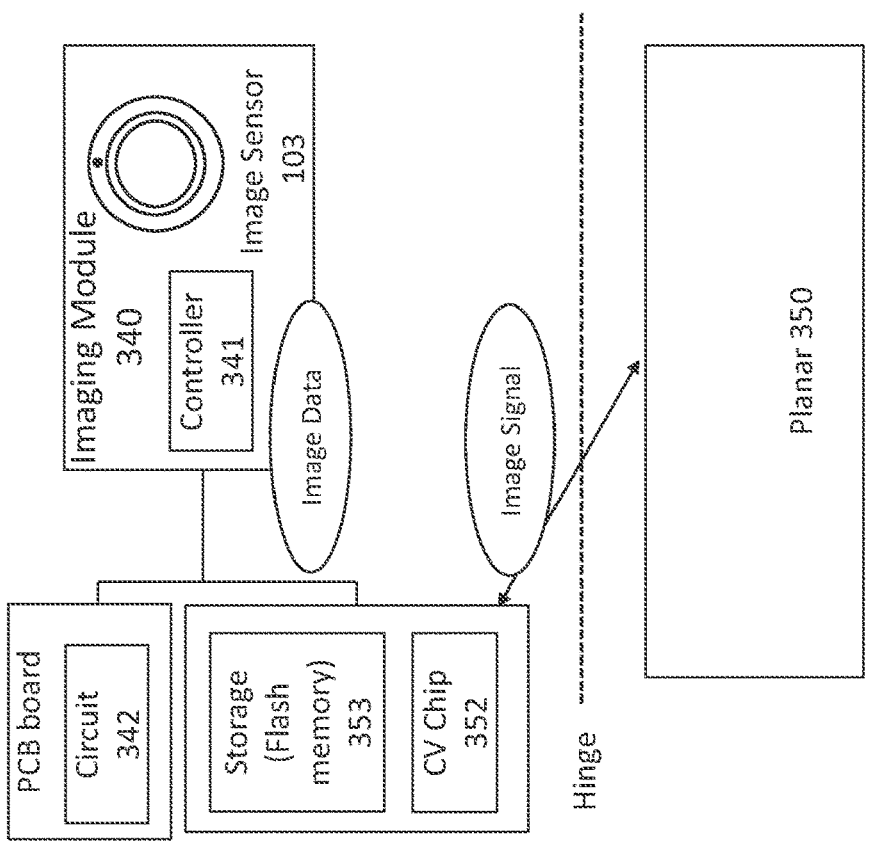
Figure 3D:
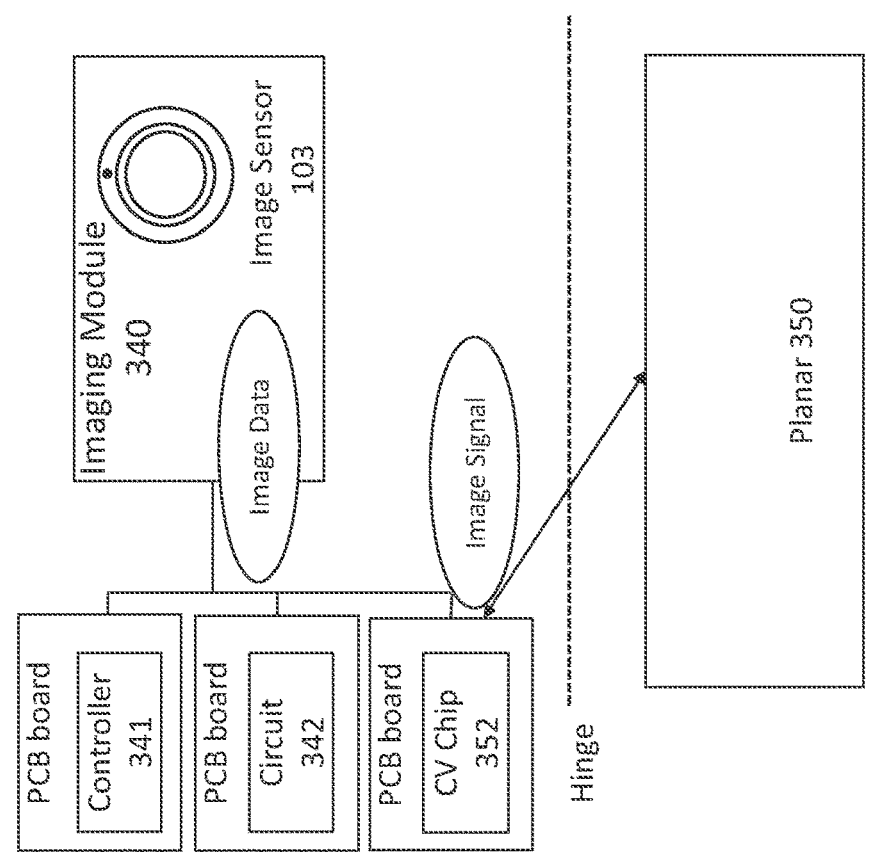

In some embodiments, as shown in FIG. 3D, the controller 341, the circuit 342, and the CV chip 352 may have their own printed circuit board (PCB) and connected with the imaging module 340 via a flexible PCB connector (FPC) and/or a flat flexible cable (FFC) cable.

In other embodiments, a flash memory 353 may be incorporated into the same substrate with the CV chip 352 or disposed proximate to the CV chip 352, as shown in FIG. 3E. The flash memory 353 may be used when an external memory is necessary. Further, the CV chip 352 may be integrated with a flash memory.

FIG. 4A shows a schematic view of relevant components 400 in the device 100 according to one or more embodiments. In connection with the performance of the display 107, the device 100 may include pixels in the display 107, a display control unit 410, as well as the CPU 310, the power controller 312, the display engine 314, a clock 424, the IPU 315, the ISP, and the GPU 311. The display control unit 410 may be in communication with the CV chip 352. The display control unit 410 may include a light emission calculator 411 and a controller 412.

In some embodiments, the controller 412 determines which pixels should be black at a certain time according to a command from the luminescence-determining program.

The display control unit 410 thus sends commands to the pixels as output from the luminescence-determining program.

The status of pixels in the display may be determined as a part of display data at the display control unit 410. The distinction between color-lit pixels 401 and black pixels 402 may be made computationally based on outputs from the luminescence-determining program. Alternatively, the light emission calculator 411 at the display control unit 410 determines the status of pixels after the intensity of light around the pixels is measured with a light detector. The display control unit 410 exchanges the status of pixels with the power controller 312, and the display engine 314, for example.

In other embodiments, the assignment of black periods to pixel lines may be provided as a manufacturer-coded program to the controller 412. The first black period and the first group of lines of pixels may be identified by analyzing the manufacturer-coded program. When there is more than one black period, other black periods as well as corresponding groups of lines of pixels may be identified using the same method.

In accordance with one or more embodiments, the display control unit 410 conveys a command to the display engine 314 dictating which groups of lines of pixels should be black at a certain time. The display engine 314 communicates with the clock 424 and pauses light emission of the black pixels during indicated black periods.

Figure 4B:
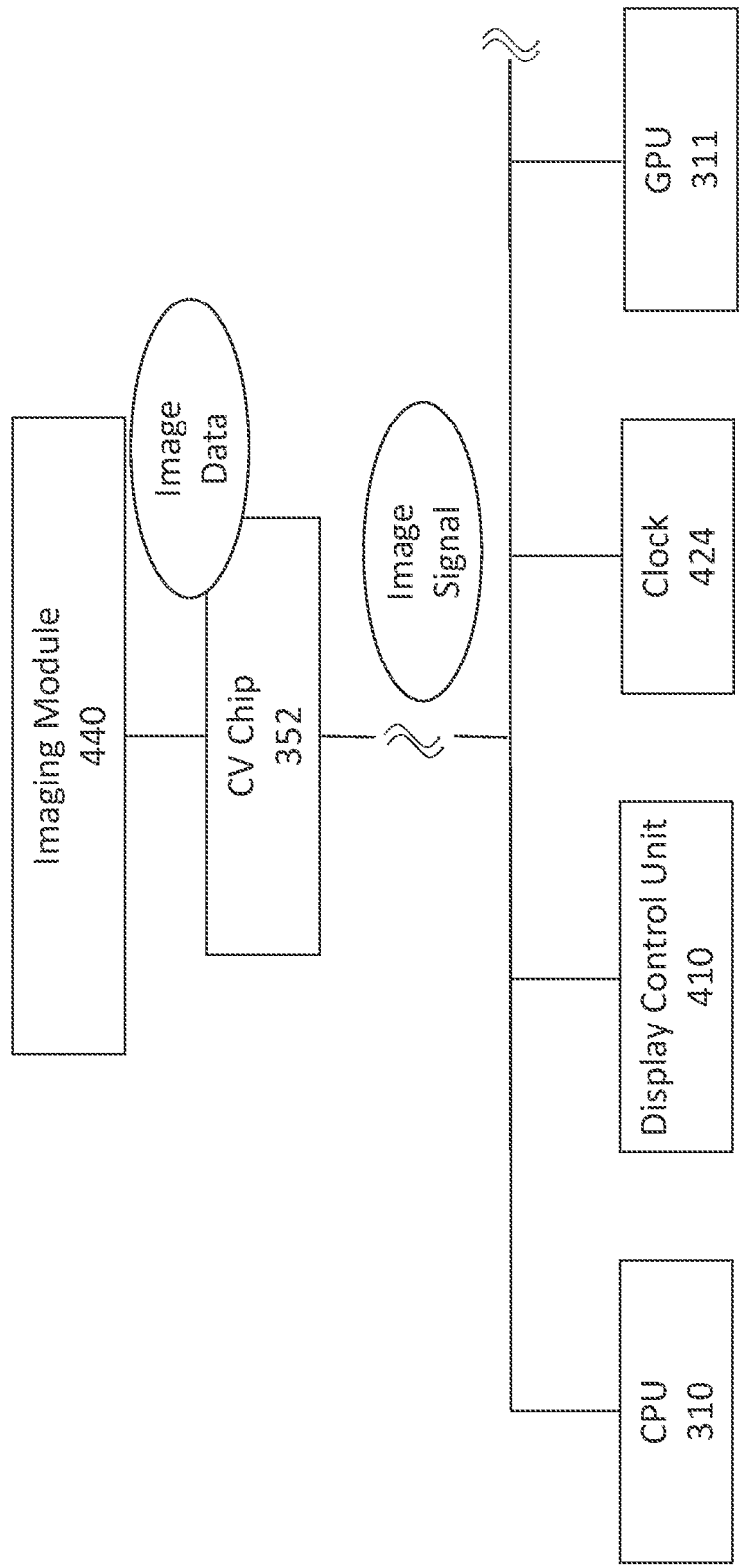

FIG. 4B shows another schematic view of the implementation of the device 100.

In one exemplary implementation, the imaging module 340 (indicated as a component 440 in FIG. 4B) generates image data after acquiring an image. The CV chip 352 receives the image data and processes the image data, for example, by adding notations. Such notations may include a notation of the image acquisition time, a notation of the angle of the image sensor 103, a notation of the focus of the image sensor 103, and the like. The CV chip 352 transmits an image signal to the IPU 315, which further transmits the image signal to the GPU 311, the CPU 310, and the clock 424, in some embodiments. In some examples, the CV chip 352 may include an FPGA programed to physically pass the image data directly through it with no processing.

In general, the relevant components described above in FIGS. 4A and 4B work as follows: The controller 412 collects information on the pattern of light emission, and ultimately black periods, of each line of pixels. In some embodiments, the controller 412 requests a light sensor within the device 100 to send information on the light emission of lines of pixels. The light sensor then senses the distribution and intensity of light emission of the lines of pixels on the display 107.

The controller 412 determines which pixels are emitting light using the detected distribution of light emission. Alternatively, the controller 412 may estimate light emission through computation. The light emission calculator 411 may receive data from a light sensor or outputs of the luminescence-determining program to identify the assignment of black periods to each pixel or pixel line. The light emission calculator 411 calculates from what time to what time particular pixels or lines of pixels are black based on the data or the outputs. A pattern of black periods for groups of lines of pixels is thus determined.

The foregoing information about the light emission from pixels on the display 107 may constitute display data and thus be communicated to the display control unit 410 in some embodiments.

In some embodiments, the first black period and the first group of lines of pixels are determined by analyzing the manufacturer-coded program. The same process is applied to the second black period as well as the second group of lines of pixels when there are more than one black period.

Further, the controller 412 may receive inputs from, for example, the CV chip 352 and the GPU 311, as to the speed of image acquisition of the image sensor 103. The information may be transmitted from the CV chip 352 to the IPU 315, ultimately to the display control unit 410, and the GPU 311 in some embodiments.

The controller 412, considering the expected image quality, the location of the overlapping pixels, the specified capacity/function of the image sensor 103 to be used, and display data, decides steps of image capturing. The controller 412 determines the number of groups of lines of pixels, and determines when each of the groups of lines of pixels will be in black periods.

In one or more embodiments, the controller 412 divides image capturing into n partial images, wherein the n is an integer greater than 0. Based on the identified black periods of various groups of lines of pixels, the controller 412 sets a first to an n-th groups of lines of pixels, in combination with a first to an n-th black periods. An image capturing instruction that includes expected image quality is generated.

The controller 412 communicates with the CV chip 352, and requests that n images (a first to an n-th images) be captured during the first to the n-th black periods. In some embodiments, the controller 412 instructs the imaging module 340, directly or indirectly, as to the selection of an image sensor 103 and expected image qualities in comparison to specified capacity/function of the image sensor 103.

For example, the selected image sensor 103 captures the first to the n-th images that will be displayed by the first to the n-th groups of lines of pixels in the display 107, respectively, at the first to the n-th black periods, respectively. The CV chip 352 receives image data of n images and transmits image signals sequentially, or concurrently to the GPU 311 via the IPU 315. The image signal is also transmitted to the CPU 310. The CPU 310 determines whether to transmit a control signal that contains instructions such as an adjustment of image capturing to the CV chip 352 and the display control unit 410. The CV chip 352 and the display control unit 410 may adjust subsequent light emission sequences and image acquisitions according to the control signal.

The GPU 311 transmits a command to the display control unit 410 to construct an image that combines n images from the image signals. On the display 107, the first to the n-th images span the first to the n-th groups of lines of pixels, respectively. Reduced image noise is achievable when the n images are captured during respective black periods of the n groups of lines of pixels.

FIGS. 5A to 5D are flowcharts of methods for reducing image noise according to one or more embodiments.

One or more of the individual steps shown in FIGS. 5A to 5D may be omitted, repeated, and/or performed in a different order than the order shown in FIGS. 5A to 5D. Accordingly, the scope of the invention should not be limited by the specific arrangement as depicted.

Figure 5A:
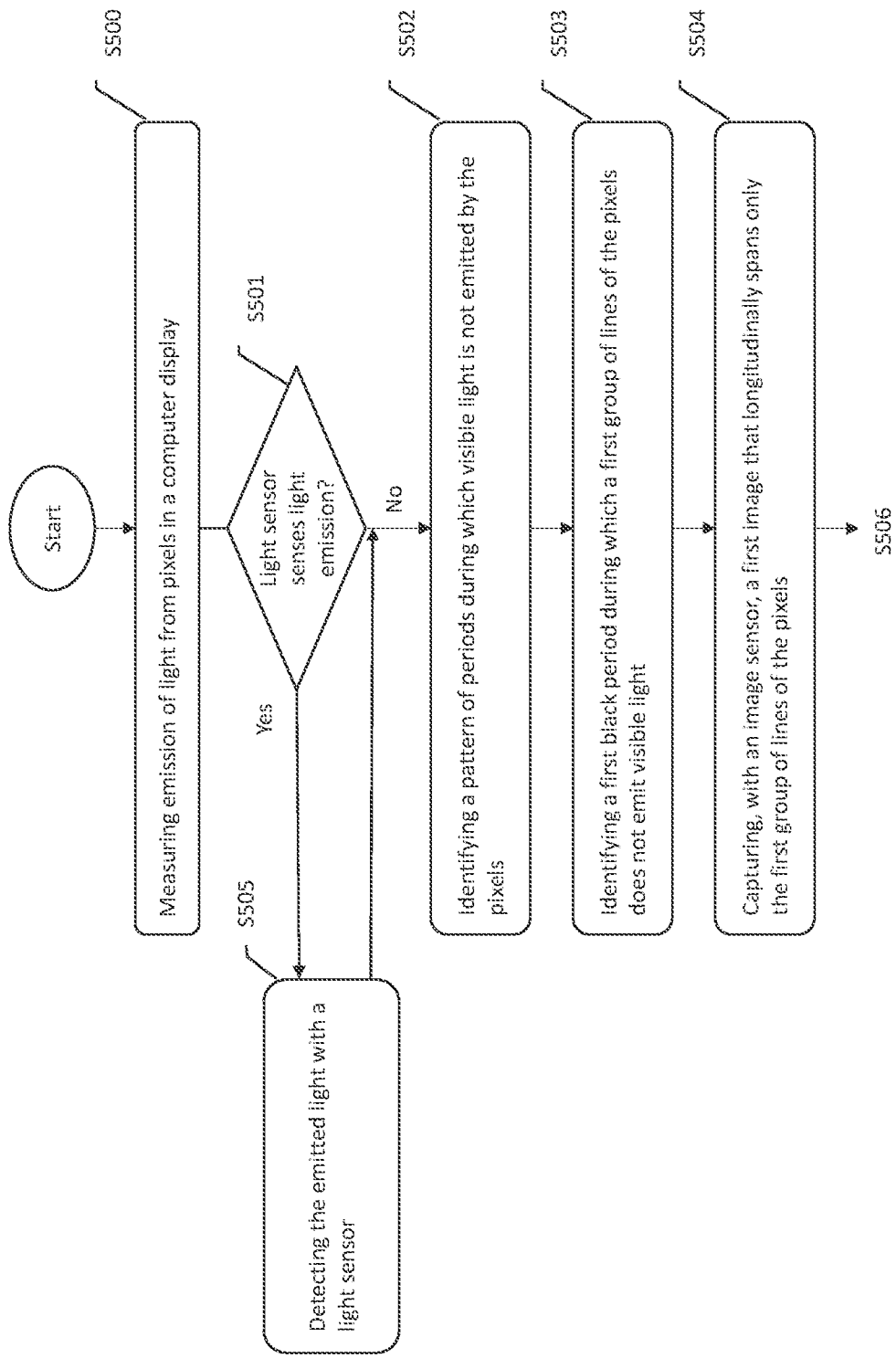
FIGS. 5A to 5D show flowcharts for reducing image noise according to one or more embodiments.

Referring to FIG. 5A, at S500, the controller 412 of the device 100 measures emission of light by pixels in the display 107.

At S501, the controller 412 determines whether light emission of pixels is sensed by a light sensor.

If the controller 412 determines that light emission is sensed by a light sensor by checking the connection with the light sensor and the status of the light sensor, the controller 412 detects the emitted light with the light sensor at S505 as shown in FIG. 5A. For example, the controller 412 requests the light emission calculator 411 for information about the light emission from certain lines of pixels, and the light emission calculator 411 may collect such information based on the emitted light detected by a light sensor. The controller 412 thus can detect the emitted light from the lines of pixels.

If light emission is not sensed by a light sensor, the controller 412 measures the emitted light, for example, by receiving outputs of the luminescence-determining program to identify the assignment of black periods to pixel lines (not shown in FIG. 5A).

At S502, the controller 412 identifies a pattern of periods during which visible light is not emitted by the pixels based on the outputs of the luminescence-determining program in accordance with some embodiments. After finding that all the pixels in certain lines ("a first group of lines of the pixels") within the overlapping pixels are black at a regular interval, the controller 412 can estimate from what time to what time ("a first black period") the first group of lines of the pixels will become black in the future.

In some embodiments, the assignment of black periods to pixel lines may be provided as a manufacturer-coded program to the controller 412. Analysis of the manufacturer-coded program will determine the first black period and the first group of lines of pixels. When there is more than one black period, the same process is applied to other black periods and corresponding groups of lines of pixels.

At S503, the controller 412 identifies the first black period of the first group of lines of the pixels during which a first group of lines of the pixels do not emit visible light.

At S504, the controller 412 captures with the image sensor 103 installed behind the overlapping pixels, a first image that longitudinally spans only the first group of lines of the pixels among the overlapping pixels. In one or more embodiments, the controller 412 may generate an instruction that the first image be captured during the first black period by the image sensor 103. The instruction may be conveyed to the CV chip 352, and then to the imaging module 340.

In other embodiments, the CV chip 352 may instruct the image sensor 103 to capture the first image during the first black period.

Figure 5B:
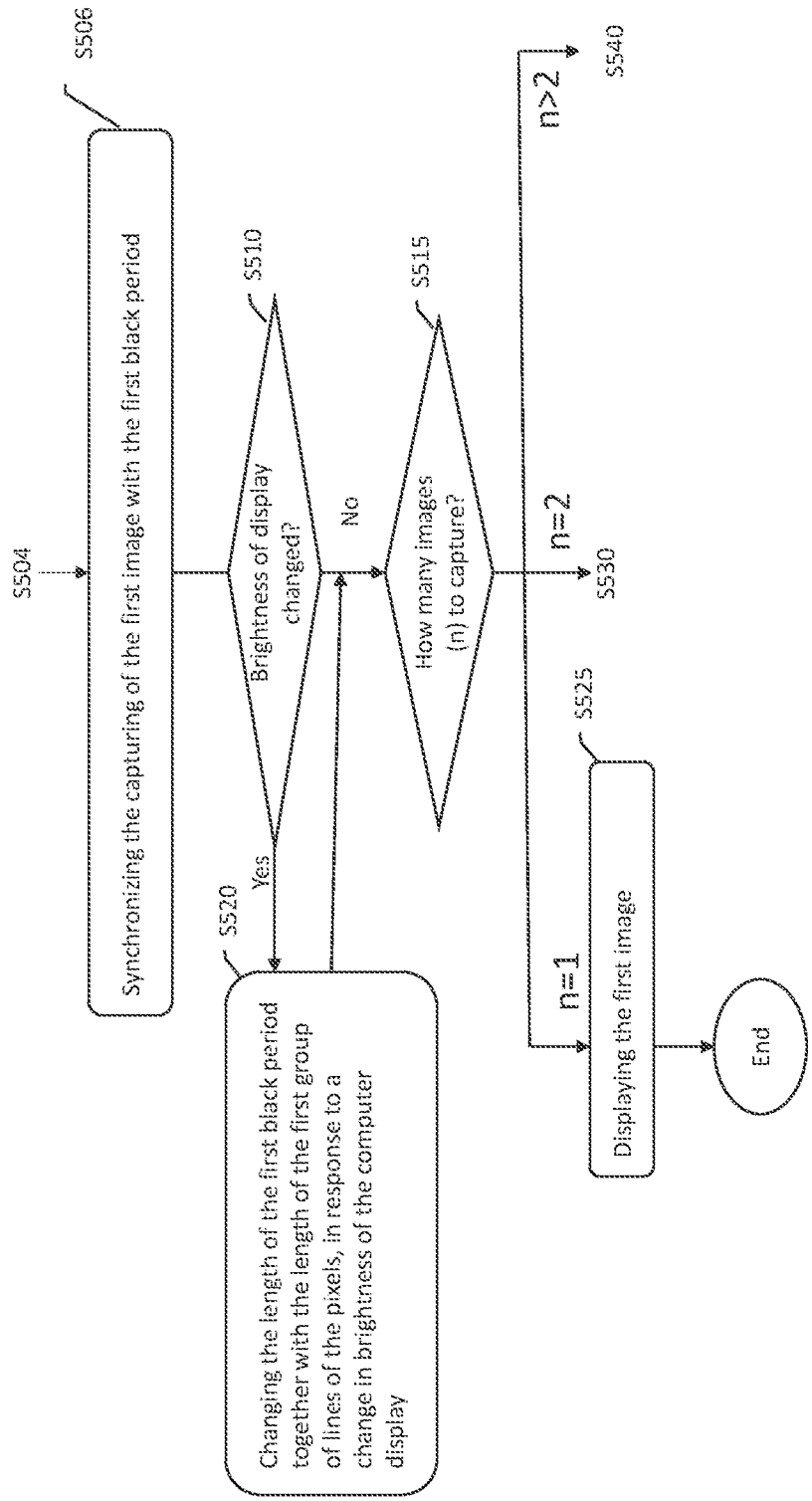

Referring to FIG. 5B, at S506, the controller 412 synchronizes the capturing of the first image with the first black period. For example, the CV chip 352 sends a command to the image sensor 103 to capture the first image at the first black periods in some implementations.

Still at FIG. 5B, at S510, the controller 412 determines whether there has been a change to the brightness of the display 107. If the CV chip 352 is reconfigured, the step proceeds to S520.

At S520, in response to a change in brightness of the display 107, the length of the first black period together with the length of the first group of lines of the pixels is changed. For example, when the brightness of the display is reduced, the black period for a particular line of pixels may be increased. Thus, the controller 412 will redetermine the number of groups of lines of pixels for image capturing. In one or more embodiments, the controller 412 divides image capturing into n' partial images, wherein the n' is an integer smaller than n, and greater than 0. In such embodiments, the controller 412 can identify a first, a second, to an n'-th groups of lines of the pixels and determines when each of the groups of lines of pixels will be in black periods (a first to an n'-th black periods), using the above-described procedures.

If the controller 412 determines that the brightness of the display 107 is not changed, the step proceeds to S515.

At S515, the controller determines how many images should be captured. For example, the controller 412 determines the number of groups of lines of pixels based on factors such as the capacity of an image sensor 103 and the expected speed of signal processing. In one or more embodiments, the controller 412 divides the image capturing into n partial images, wherein the n is an integer greater than 0. In such embodiments, the controller 412 can identify a first, a second, to an n-th groups of lines of the pixels and determines when each of the groups of lines of pixels will be in black periods (a first to an n-th black periods), using the above-described procedures.

If there should be two images (n=2), the step proceeds to S530. If there should be more than two images (n>2), the step proceeds to S540.

Figure 5C:
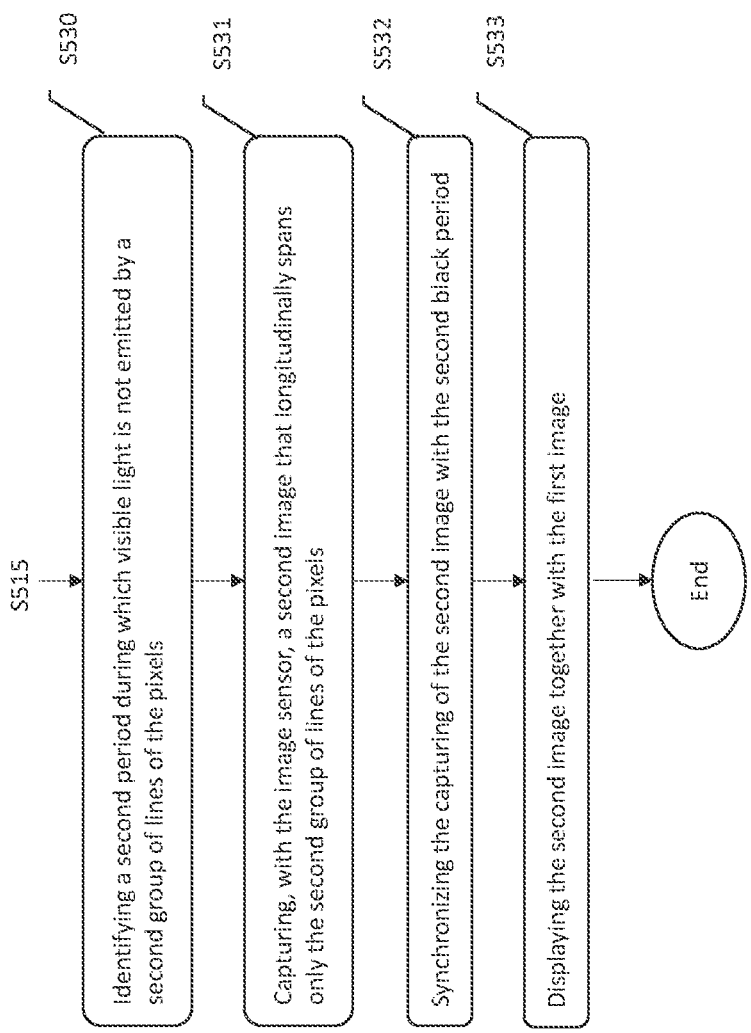

Referring to FIG. 5C, at S530, the controller 412 identifies a second period during which visible light is not emitted by a second group of lines of the pixels among the overlapping pixels. As explained in the description of S502, the controller 412 identifies a pattern of black periods of lines of pixels and identifies a second group of lines of the pixels and a second black period.

At S531, the controller 412 captures, with the image sensor 103, a second image that longitudinally spans only the second group of lines of the pixels in accordance with one or more embodiments. In certain embodiments, the controller 412 may generate an instruction to the CV chip 352 that the second image be captured during the second black period. The instruction is further conveyed from the CV chip 352 to the imaging module 340 or the image sensor 103. In other embodiments, the CV chip 352 may give an instruction to the image sensor 103 to capture the second image spanning only the second group of lines of the pixels.

At S532, the controller 412 synchronizes the capturing of the second image with the second period. As one implementation, the CV chip 352 sends a command to the image sensor 103 to capture the second image at the second black period in some embodiments.

At S533, the controller 412 displays the second image together with the first image on the display. In one implementation, the imaging module 340 generates image data and transmits to the CV chip 352. The CV chip 352 generates image signals and transmits to the GPU 311 via the IPU 315. The GPU 311 transmits a command to the display control unit 410 to construct an image that combines the first image and the second image. On the display 107, the first image and the second image span the first group and the second group of lines of pixels, respectively.

Figure 5D:
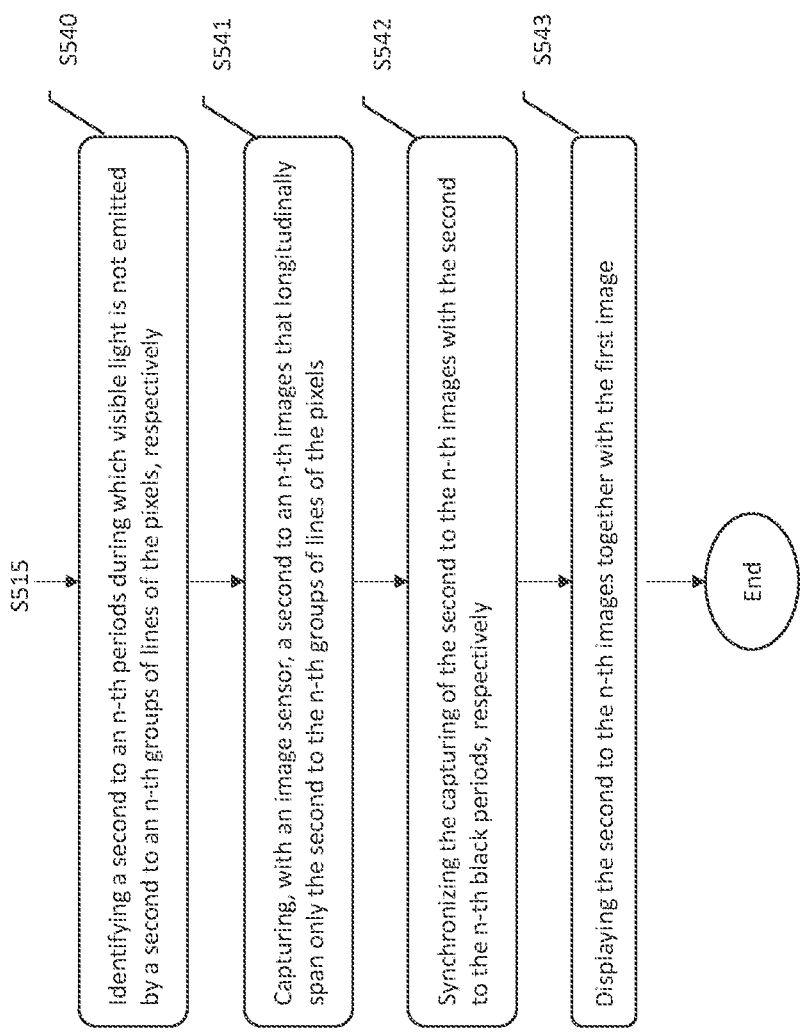

Referring to FIG. 5D, at S540, the controller 412 identifies a second to an n-th black periods during which visible light is not emitted by a second to an n-th groups of lines of the pixels among the overlapping pixels respectively, wherein n is an integer greater than two.

At S541, the controller 412 captures, with the image sensor 103, a second to an n-th images that longitudinally span only the second to the n-th groups of lines of the pixels, respectively. The controller 412 communicates with the CV chip 352, and requests that n images (a first, a second, to an n-th images) be captured during the first, the second, to the n-th black periods, respectively.

At S542, the controller 412 synchronizes the capturing of the second to the n-th images with the second to the n-th black periods, respectively. In one implementation, the controller 412 may send an instruction to the imaging module 340 to capture, with the image sensor 103, the first, the second, to the n-th images at the first, the second, to the n-th black periods, respectively. In other implementations, the CV chip 352 instructs the imaging module 340 and the image sensor 103 to capture n images.

At S543, the controller 412 displays the second to the n-th images together with the first image on the display. For example, the image module 340 generates image data and transmits to the CV chip 352. The CV chip 352 generates image signals and transmits to the GPU 311, the CPU 310, and the clock 424 via the IPU 315. The GPU 311 transmits a command to the display control unit 410 to construct an image combining the first image, the second image, to the n-th image. On the display 107, the first image, the second image, to the n-th image span the first group and the second group of lines of pixels, respectively.

One or more of the embodiments may offer a solution for reducing image noise in CV-enabled computers and other electronic devices by: identifying a pattern of periods during which visible light is not emitted by the pixels; identifying a first black period during which a first group of lines of the pixels does not emit visible light; capturing, with an image sensor installed behind (i.e., under) the display, a first image that longitudinally spans only the first group of lines of the pixels; and synchronizing the capturing of the first image with the first black period. The present disclosure may be also implemented by a computer-vision enabled device comprised of a display, an image sensor behind the display, and a controller that: captures with the image sensor, a first image that longitudinally spans only a first group of lines of the pixels that do not emit visible light during a first black period; and synchronizes the capturing of the first image with the first black period.

These advantages demonstrate that one or more embodiments advance the reduction of image noise when using a CV-vision enabled computing device and other electronic devices.

Although the invention has been described with respect to a limited number of embodiments, those skilled in the art, having benefit of this disclosure, will appreciate that various other embodiments may be devised without departing from the scope of the present invention. Accordingly, the scope of the invention should be limited only by the attached claims.

What is claimed is:

1. A method for reducing image noise in computer vision, comprising:
   identifying a pattern of periods during which visible light is not emitted by pixels;
   identifying a first black period during which a first group of lines of the pixels does not emit visible light;
   capturing, with an image sensor installed behind a display, a first image that longitudinally spans only the first group of lines of the pixels;
   synchronizing the capturing of the first image with the first black period;
   identifying a second black period during which visible light is not emitted by a second group of lines of the pixels;
   capturing, with the image sensor, a second image that longitudinally spans only the second group of lines of the pixels;
   synchronizing the capturing of the second image with the second period; and
   displaying the second image together with the first image on the display,
   wherein the image sensor is located behind the first group of lines of the pixels, and the second group of lines of pixels.

2. The method of claim 1, further comprising: detecting an emitted light with a light sensor.

3. A method for reducing image noise in computer vision, comprising:
   identifying a pattern of periods during which visible light is not emitted by pixels;
   identifying a first black period during which a first group of lines of the pixels does not emit visible light;
   capturing, with an image sensor installed behind a display, a first image that longitudinally spans only the first group of lines of the pixels;
   synchronizing the capturing of the first image with the first black period;
   identifying a second to an n-th black periods during which visible light is not emitted by a second to an n-th groups of lines of the pixels respectively, wherein n is an integer greater than two;
   capturing, with the image sensor, a second to an n-th images that longitudinally span only the second to the n-th groups of lines of the pixels, respectively;
   synchronizing the capturing of the second to the n-th images with the second to the n-th black periods, respectively; and
   displaying the second to the n-th images together with the first image on the display.

4. The method of claim 3, wherein the image sensor is located behind the first group of lines of the pixels, and the second to the n-th groups of lines of the pixels.

5. The method of claim 1, further comprising:
   in response to a change in brightness of the display, changing a length of the first black period together with a length of the first group of lines of the pixels.

6. A computer-vision enabled device, comprising:
   a display;
   an image sensor behind the display; and
   a controller that:
      captures with the image sensor, a first image that longitudinally spans only a first group of lines of pixels in the display that do not emit visible light during a first black period,
      synchronizes the capturing of the first image with the first black period,
      captures, with the image sensor, a second image that longitudinally spans only a second group of lines of the pixels that do not emit visible light during a second black period,
      synchronizes the capturing of the second image with the second period, and
      displays the second image together with the first image on the display, wherein
   the image sensor is located behind the first group of lines of the pixels, and the second group of lines of pixels.

7. The computer-vision enabled device of claim 6, wherein the controller further changes, in response to a change in brightness of the display, a length of the first black period together with a length of the first group of lines of the pixels.

* * * * *